United States Patent Office 3,804,784
Patented Apr. 16, 1974

3,804,784
NITROCELLULOSE/SYNTHETIC POLYMER ADHESIVES
Irving P. Esbitt, Wycliffe, Del., assignor to E. I. du Pont de Nemours and Company, Wilmington, Del.
No Drawing. Filed Oct. 26, 1971, Ser. No. 192,335
Int. Cl. C08b 21/12, 21/14
U.S. Cl. 260—14      8 Claims

ABSTRACT OF THE DISCLOSURE

There are provided blends of film-forming polymers and solutions thereof in solvents providing a desired evaporation rate for use of said solutions in nail-magazine manufacture. Nails bearing the film-forming polymers are also provided.

---

The present invention is directed to novel compositions useful in providing self-supporting polymeric films. The self-supporting polymeric films and fasteners such as nails with such films are also provided.

Many of these compositions and films have, under appropriate conditions, as hereinafter described desirable properties of the type suitable for use in the manufacture of "magazines" of fasteners such as nails, staples and the like.

In the manufacture of such fasteners, magazines or clips are formed comprising a plurality of fasteners. Tape and adhesive are often used to adhere a magazine of nested fasteners in an ordered configuration. In production thought to be typical, the nested fasteners are passed in front of an extruder head which issues adhesive, and another taping machine. After an appropriate magazine size is reached, it is cut from the advancing bank of nails, and drops to a conveyor. A magazine may typically be between 6 inches and 12 inches in length for nails.

Many patents have issued on various methods of making fastener magazines. Illustrative are U.S. 3,152,334, issued Oct. 13, 1964; U.S. 3,339,720, issued Sept. 5, 1967; U.S. 3,276,576, issued Oct. 4, 1966; and U.S. 3,358,822, issued Dec. 19, 1967, the disclosures of which are hereby incorporated by reference.

Breakage of adhesive may occur in the magazine drop if the adhesive which binds the nails is too brittle. If the adhesive is not strong enough, the nail magazine will also come apart.

The present invention is a composition consisting essentially of film-forming polymer and solvent therefor said film-forming polymer consisting essentially of (a) at least one nitrocellulose compound having a nitrogen content between 10.9 and 12.2 as determined by ASTM D301–56 with a viscosity of between ½ second and 1000 seconds as determined by ASTM Method D301–56 and
(b) at least one member of the group consisting of methyl methacrylate polymer and copolymer thereof, methacrylic esters, polyvinyl butyral, polyvinyl acetate, butadiene/acrylonitrile rubber crosslinked with phenolic resin, epoxyester crosslinked with phenol formaldehyde, polyester crosslinked with isocyanate, said solvent has a relative evaporation rate (RER) of at least 500 based on a linear correlation of RER for each solvent component present with its weight percent of total solvent.

Preferably, there is present at least one nitrocellulose compound with a viscosity of less than one second and at least one nitrocellulose compound with a viscosity of greater than 40 seconds.

The film-forming polymer in one embodiment includes at least one member of the group consisting of methyl methacrylate polymer and copolymers thereof, polymethacrylic esters having a Tg between —5° C. to 105° C., and polyacrylic esters having a Tg of between —24° C. and a brittle point of 8.

Preferably, film-forming polymer includes polyvinyl acetate with a Tg of about 84° C. or includes at least one member of the group consisting of polymethyl methacrylate/MESO copolymer, polymethacrylate esters having a Tg between —5° and 105° C., polyacrylic esters having a Tg between —24° C. and a brittle point of 8 wherein MESO is 3,2-methacryloxyethyl, 2,2-spirocyclohexyloxazolidine, preferably in combination with at least one nitrocellulose compound with a viscosity of less than 1 second and at least one nitrocellulose compound with a viscosity of greater than 50 seconds.

The solvent consists preferably of a mixture of at least two compounds, at least one having an RER of at least 800.

Preferably, there also is present at least one solvent component with an RER of less than 800 most desirably present in an amount of less than 5% by weight of the solvent blend. The solutions preferably contain between 15% and 35% solids of which preferably at least 70% and most preferably between 85% and 90% thereof is film-forming polymers.

There is also provided a blend of film-forming polymers, said polymers consisting essentially of (a) at least one nitrocellulose compound having a nitrogen content of between 10.9 and 12.2 as determined by ASTM D301–56 with a viscosity of between ½ second and 1000 seconds as determined by ASTM Method D301–56 and
(b) at least one member of the group consisting of methyl methacrylate polymer and copolymers thereof, methacrylic esters, polyvinyl butyral, polyvinyl acetate, butadiene acrylonitrile rubber crosslinked with phenolic resin, epoxy-ester crosslinked with phenol formaldehyde, polyester crosslinked with isocyanate.

Preferred polymer embodiments in the aforementioned solutions are also preferred in the blend.

These blends in the form of a self-supporting film also are provided.

The nitrocellulose preferably comprises betwen about 75 to 98% by weight of the film-forming polymer preferably between 85% and 98% and most preferably, the nitrocellulose comprises between about 93 to 97% by weight of the film-forming polymer.

"Film-forming polymer" means a polymer which when dissolved in solvent therefore and cast on a surface at room temperature will form a self-supporting film on removal from that surface. A surface is chosen to which the "film" will not adhere.

"Nitrocellulose" has its usual meaning as defined in Hackh's Chemical Dictionary, 3rd ed., McGraw-Hill (1944).

In the above required film-forming polymer, each of component (a) and (b) is of film-forming molecular weight.

Methyl methacrylate polymers and copolymers refer to polymeric compounds having at least 50% of their repeating units derived from monomeric methyl methacrylate. Other copolymeric components can include units derived from monomers of esters, amides and other derivatives of methyl methacrylate and other units derived from monomers of widely varying nature. Other monomers suitable for preparing such polymers are adhesion promoting acrylics such as 2-hydroxy-3-amino propyl methacrylate, 2-(1-aziridinyl) ethyl methacrylate, N,N-dimethyl and 2-aminoethyl methacrylate.

Polymers of methacrylic esters and copolymers thereof refers to polymers having at least 50% of their repeating units derived from monomers which are esters of methacrylic acid. Typical of such esters are methyl methacrylate, 2-ethyl hexyl methacrylate, ethyl methacrylate, butyl methacrylate, isobutyl methacrylate and the like. Copolymerizable therewith can be any compatible monomer including those above mentioned for the methyl methacrylate copolymer systems.

Butadiene/acrylonitrile rubber systems includes those resins such as the "Hycar" resins marketed by B. F. Goodrich. Copolymerized units of butadiene and acrylonitrile in various proportion, alters the physical properties thereof. These can be crosslinked through pendant carboxyl groups by phenolic resin as is known in the art.

Representative of the epoxy esters which may be crosslinked with formaldehyde resin and are within the scope of this invention are those which are disclosed along with the process of preparing such crosslinkable resins from U.S. Pat. 2,819,222. Especially preferred is the epoxide derived from the epichlorohydrin of bisphenol A and its derivatives.

Representative polyesters which can be crosslinked with isocyanates are those disclosed in U.S. Pats. 2,465,319; 2,623,031 and 2,623,033.

RER number—relative evaporation rate—is a measure of the comparative volatility of various solvents by comparison with butyl acetate (RER=100) and is measured at 25° C. in still air. It is a measure of the time it takes for a given amount of solvent to evaporate as compared to the time it takes for the same amount of butyl acetate to evaporate. Tabulation of RER values can be found in Encyclopedia of Chemical Technology, edited by Raymond E. Kirk and Donald Othmer, New York, Interscience, 1954, vol. 12, p. 670.

A wide range of nitrocellulose components may be used in the compositions of this invention. Theoretically, nitrocellulose may contain as much as 14.1% nitrogen which corresponds to a degree of substitution of about 3. Nitrocellulose especially desired herein falls in the range of 10.2–12.2% nitrogen, equivalent to a degree of substitution between about 1.9 and 2.3.

While nitrocellulose compounds such as those in Table I are useful in this invention,

TABLE I

| Viscosity, seconds: | Nitrogen content, percent |
|---|---|
| ½ | 10.9–11.2 |
| 80–120 | 11.8–12.2 |
| 0–40 | 11.8–12.2 |
| 40–60 | 11.8–12.2 |
| 5–6 | 11.8–12.2 |
| ⅛ | 11.8–11.2 |
| 40–60 | 10.9–11.2 | it has been found most useful to use blends of nitrocellulose compounds in the formulation for use as a fastener magazine adhesive.

Among the useful nitrocellulose blends are those of Table II.

TABLE II

| Viscosity, seconds: | | Nitrogen content, percent |
|---|---|---|
| (A) | ½ | 10.9–11.2 |
|  | 40–60 | 10.9–11.2 |
| (B) | 5–6 | 11.8–12.2 |
|  | 40–60 | 10.9–11.2 |
| (C) | 0–40 | 11.8–12.2 |
|  | ⅛ | 11.8–12.2 |
| (D) | ½ | 10.9–11.2 |
|  | 80–120 | 11.8–12.2 |

The preferred nitrocellulose components of the composition of this invention is a blend of (1) and (2).

| Viscosity, seconds: | Nitrogen content, percent |
|---|---|
| (1) ½ | 10.9–11.2 |
| (2) 80–120 | 11.8–12.2 |

The proportions will vary dependency on the intended function. Lower viscosity nitrocellulose yields higher solids content in final compositions in typical solvent. Higher viscosity nitrocellulose yields lower solids content in typical solvents but better toughness and flexibility in lacquer coatings. Higher nitrogen content yields improved solubility in typical solvents whereas lower nitrogen content yields lower solubility in typical solvents.

In the material preferred as a nail adhesive, the low viscosity (high "seconds") material comprises between 20 to 40% and more preferably between about 30 and 35% of the nitrocellulose content, and has a viscosity of at least 40 seconds and preferably 80 seconds but preferably less than 200 seconds, the remainder having a viscosity of one second or less, but preferably between ½ and 1 second.

Typical of the preferred polymer blend is:

| | Percent |
|---|---|
| ½ second, nitrogen (10.9–11.2%) polymer | 65.27 |
| 80–120 seconds, nitrogen (11.8–12.2%) polymer | 20.02 |
| Methyl methacrylate/MESO copolymer | 8.67 |
| Isobutyl methacrylate polymer | 6.04 |

Preferred solvent therefor is by weight of solvent:

| | Percent |
|---|---|
| Acetone | 42.53 |
| Butyl acetate | 1.31 |
| Ethyl acetate | 37.53 |
| Methyl ethyl ketone | 18.63 |

A soltuion thereof at a solids level of 25.5% by weight and about 22.8% by weight film-forming polymer is preferred.

The solutions of this invention preferably have a Brookfield viscosity of between 20 and 70 poises and more preferably between 40 and 70 poises.

This invention includes a polymer (b) component including all those aforementioned, preferably in the range of between about 2 and 25% and most preferably 2 and 15% by weight based on the combined weight of polymer (a) (nitrocellulose) and polymer (b) components.

Other specific compositions within the invention include:

| | | Percent based on total polymer by weight |
|---|---|---|
| (I) | Methyl methacrylate-methacrylic acid polymer | 16.1 |
|  | ½ second, nitrogen (10.9–11.2%) nitrocellulose | 50.2 |
|  | 40–60 seconds, nitrogen (10.9–11.2%) nitrocellulose | 33.7 |
| (II) | Methyl methacrylate-methacrylic acid | 4.0 |
|  | ½ second, nitrogen (10.9–11.2%) nitrocellulose | 35.3 |
|  | 40–60 seconds, nitrogen (10.9–11.2%) nitrocellulose | 23.6 |
|  | Polyvinyl acetate | 37.1 |
| (III) | Methyl methacrylate-methacrylic acid polymer | 4.7 |
|  | ½ second, nitrogen (10.9–11.2%) nitrocellulose | 56.6 |
|  | 40–60 seconds, nitrogen (10.9–11.2%) nitrocellulose | 17.9 |
|  | Polyvinyl butyral | 20.8 |
| (IV) | Methyl methacrylate/MESO polymer | 7.1 |
|  | Isobutyl methacrylate polymer | 5.0 |
|  | ½ second, nitrogen (10.9–11.2%) nitrocellulose | 53.5 |
|  | 80–120 seconds, nitrogen (11.8.12.2%) nitrocellulose | 16.4 |
|  | Polyvinyl butyral | 18.0 | or in other various proportions. In the above table the methyl methacrylate-methacrylic acid copolymer has less than 15% methacrylic acid by weight.

The polymer composition of this invention can be used in solvent which may be preferably is a blend of individual solvents for each of the individual components.

Specific solutions of each of the above compositions includes:

Polymer composition I in:  Percent by wt. of solvent
- Ethyl acetate _____ 40.6
- Acetone _____ 35.4
- Methyl ethyl ketone _____ 22.3
- Butyl acetate _____ 1.7

Polymer composition II in:
- Ethyl acetate _____ 37.5
- Acetone _____ 42.6
- Methyl ethyl ketone _____ 18.6
- Butyl acetate _____ 1.3

Polymer composition III in:
- Ethyl acetate _____ 35.6
- Acetone _____ 61.3
- Butyl acetate _____ 3.1

Polymer composition IV in:
- Ethyl acetate _____ 27.7
- Acetone _____ 65.3
- Methyl ethyl ketone _____ 11.3
- Butyl acetate _____ 0.8 wherein film forming polymer is present at 20% by weight.

Typical solvents for nitrocellulose are alkyl alcohols such as ethanol, butyl alcohol propyl, isopropyl alcohol, alkyl esters of acetic acid, especially lower alkyl esters of acetic acid and ketones such as acetone, methylethyl ketone isophorone and others.

Typical solvents for polymer (b) are also known in the art and will vary for polymer type. For methacrylic esters such solvents include ketones such as acetone, methylethyl ketone, methyl acetate, etc. For polyvinyl butyral and polyvinyl acetate, similar ketones and alcohols are considered effective. Typical suitable alcohols are ethanol and isopropanol. Typical suitable acetate ester solvents are acetone, MEK (methyl ethyl ketone), methyl isobutyl ketone and cyclohexanone. For butadiene/acrylonitrile rubber-phenol crosslinked systems, ketones included in those thought suitable are those recited above. For epoxy ester-phenol formaldehyde systems and polyester/isocyanate systems ketones included in those thought suitable are those recited above. Acetone is thought less suitable due to water typically associated therewith. The above list is descriptive but not limitative.

As aforementioned, fastener magazines (or clips) are prepared from nested fasteners to which tape and adhesive is applied. In one embodiment, polymer compositions of this invention and films thereof may be adapted for use as such adhesive. The compositions with solvent according to this invention may be adapted for use as the system for applying such polymer adhesive. After applying adhesive and on equipment thought to be conventional and representative of conventional speeds, a bank of fasteners travels about 45 seconds after application of adhesive at a temperature of between about 100° C. and 150° C. and most typically at about 120–140° C. before a magazine of fasteners (nails for example) is cut to size from the advancing bank of nails. The adhesive must be of sufficient strength to endure a drop of between about 0.5 and 1 foot without fracture. Yet the adhesive must be sufficiently pliable as to withstand deformation without breaking on such a drop. Systems as aforementioned can be utilized to provide a polymer solvent blend which on application to metal quickly evaporates to provide a skin of a tough polymer film, the interior of which contains residual solvent at the time of magazine drop as to make the adhesive sufficiently pliable; this lessens the possibility of adhesive fracture.

Most typically this retention of solvent can be accomplished by providing in solvent a low RER solvent component less than 800 and preferably less than 500 and most preferably less than 200 such as butyl acetate which will be retained in the polymer under conditions in use for the time inclusive of the time of "magazine drop."

This solvent should be provided in an amount less than 10% by weight, preferably less than 5% by weight and in preferred embodiment between 1 and 2% by weight of solvent.

Simultaneously there is provided solvent component having an RER sufficiently high as to bring the solvent total RER to at least 500 and preferably at least 700 and most preferably between 800 and 1000. The high RER component or components provides for sufficiently rapid evaporation so as to form a skin on the polymer film to provide strength during the nail drop.

At operating conditions presently thought typical in forming nail magazines, methyl ethyl ketone (MEK) with an RER of 570 does not appear to provide a sufficiently tough skin in the time required and under temperature conditions prevailing as to be a preferred solvent with the aforementioned polymer blends under these conditions. Similarly, acetone with an RER of 1160 tends to evaporate under said conditions too rapidly; providing condensing moisture on the surface of the film which is undesirable.

At the time of magazine drop when the adhesive in this utility undergoes its severest property test, the film is preferably between 20 and 80% skin, the remainder being a gel type phase.

Accordingly, solvent RER of between 570 and 1160 is preferred for formulating preferred compositions within the scope of this invention providing suitable properties of strength and toughness. However, changes in the above conditions of nail magazine manufacture would make a wider range of solvents having a broader range RER most suitable.

Preferred solvent is a blend of

| | RER | Percent of total solvent in composition |
|---|---|---|
| Ethyl acetate | 615 | 37.53 |
| Acetone | 1,160 | 42.53 |
| Methylethyl ketone | 570 | 18.63 |
| Butyl acetate | 100 | 1.31 | which has an RER of about 800 as approximated by using a weight average of the RER values for individual components.

RER values for some solvents and other properties thereof are listed in Union Carbide's Chemical Corporation bulletin "Solvent Selector" F7465N which is incorporated herein by reference.

Polymer blends for this utility desirably form dried films which have an initial modulus of from about $1 \times 10^4$ to $1 \times 10^5$ p.s.i., a 4% modulus of $1 \times 10^4$ to $5 \times 10^5$ p.s.i., a tensile strength of from about $5 \times 10^3$ to $15 \times 10^3$ p.s.i. and from about 5 to 20% elongation when measured on Instron tensile tests wherein a sample is ½ inch in width, film thickness is between 1 and 5 mils, full scale load is 10 lbs., chart speed is 2.0″/minute, cross head speed is 0.2″/minute.

A film is considered dry if it undergoes no weight loss on drying at 150° C. in air for ½ hour (30 minutes).

Various other ingredients may be added to the adhesive compositions of this invention which do not detract from their desired properties; such ingredients including pigments, adhesive promoters and the like.

Plasticizers may be added and such plasticizers include camphor, phosphates such as cresyl diphenyl phosphate, phthalates such as dibutyl phthalate. Suitable adhesion promoters include silanes such as gamma/amino-propyl triethoxy-silane, vinyl tris(2-methoxy ethoxy) silane and phosphoric acid. Inert fillers such as $TiO_2$, silica and calcium carbonate may be added at loadings insufficient to affect desired properties. For example, between 0.3 and 0.7% by weight and preferably about 0.4% silanes and between 1 and 3% and preferably about 1.6% cresyl diphenyl phosphate and between 0.5 and 1% and preferably about 0.6% phosphoric acid should be satisfactory although amounts of up to 10% plasticizer of total composition (up to 37% plasticizer by weight of nitro-cellulose solids) may be desirable in some applications.

These compositions are prepared by the addition of the components slowly with mixing preferably at room temperature and typically in the following order.

Solvents
Solids (nonfluid components including film forming polymer
Mix until dissolved
Add any liquid nonsolvent
Mix to uniformity.

Standard agitator-type stirrers are suitable as used in typical lacquer preparation.

In the example which follows all parts are by weight unless indicated.

EXAMPLE

Into a 100 gallon kettle with a propeller type agitator at room temperature was added 179.8 lbs. of ethyl acetate, 203.8 lbs. of acetone and 89.0 lbs. of methyl ethyl ketone and 6.3 lbs. of butyl acetate. 167 lbs. of nitrocellulose (½ second, 10.9–11.2% nitrogen) was then added followed by adding 51.2 lbs. of (80–120 seconds, 11.8–12.2% nitrogen) nitrocellulose. 4.9 lbs. of phosphoric acid was then added.

All ingredients were added by pouring into the kettle with slow agitation. After addition of the above ingredients, agitation was continued until the nitrocellulose was dissolved.

38.8 lbs. of methyl methacrylate/MESO copolymer (of film forming molecular weight with less than 10% modification) was then added with slow stirring followed by addition of 27.0 lbs. of isobutyl methacrylate. There was then added in sequence with slow stirring 27 lbs. of isobutyl methacrylate polymer of film forming molecular weight, 12.9 lbs. of cresyl diphenyl phosphate, and 3.2 lbs. of silane adhesion promoter. Agitation was continued for one hour after the last addition. The final composition had a Brookfield viscosity of 6700 cp. and 25.5% solids, and had a weight per gallon of 7.84 lbs.

What is claimed is:

1. A composition consisting essentially of film-forming polymer in a solvent therefor said film-forming polymer comprising at least 70% by weight of the solids and consisting essentially of
   (a) 75 to 98% by weight of film-former of at least one nitrocellulose compound having a nitrogen content of between 10.9 and 12.2 as determined by ASTM D301–56 with a viscosity of between ½ second and 1000 seconds as determined by ASTM Method D301–50, and
   (b) 2 to 25% by weight of film-former of at least one member of the group consisting of methyl methacrylate polymer of at least 50 mole percent methyl methacrylate and 0 to 50 mole percent of at least one alkyl ester of methacrylic acid wherein the alkyl group has from 1 to 8 carbon atoms polyvinyl butyral, polyvinyl acetate, butadiene/acrylonitrile rubber crosslinked with phenolformaldehyde resin, epichlorohydrin-bisphenol A epoxy resin crosslinked with phenol formaldehyde, and polyester crosslinked with isocyanate,
   said solvent comprising 65 to 85% by weight of the composition and being a mixture of at least two solvents having a total relative evaporation rate (RER) of at least 500 based on a linear correlation of (RER) for each solvent component present with its weight percent of total solvent, at least one solvent having an RER of at least 500 and at least one solvent having an RER of at least 800.

2. The composition of claim 1 wherein there is present at least one nitrocellulose compound with a viscosity less than one second and one nitrocellulose compound with a viscosity of at least 40 seconds.

3. The composition of claim 1 wherein film-forming polymer (b) includes at least one member of the group consisting of methyl methacrylate polymer of at least 50 mole percent methyl methacrylate and 0 to 50 mole percent of at least one alkyl ester of methacrylic acid wherein the alkyl group has from 1 to 8 carbon atoms having a $Tg$ between $-5°$ C. to $105°$ C., and polyacrylic esters having a $Tg$ of between $-24°$ C. and a brittle point of 8.

4. The composition of claim 1 wherein film-forming polymer (b) includes polyvinyl acetate with a $Tg$ of about $84°$ C.

5. The composition of claim 2 wherein film-forming polymer (b) includes at least one member of the group consisting of polymethyl methacrylate/3,2-methacryloxyethyl, 2,2-spirocyclohexyloxazolidine copolymer, methyl methacrylate polymer of at least 50 mole percent methyl methacrylate and 0 to 50 mole percent of at least one alkyl ester of methacrylic acid wherein the alkyl group has from 1 to 8 carbon atoms having a $Tg$ between $-5°$ C. and $105°$ C., and polyacrylic esters having a $Tg$ between $-24°$ C. and a brittle point of 8.

6. The composition of claim 2 wherein film-forming polymer (b) includes polyvinyl acetate with a $Tg$ of about $84°$ C.

7. The composition of claim 1 wherein there is present at least one solvent component with a relative evaporation of less than 500.

8. The composition of claim 7 wherein solvent component with a relative evaporation rate of less than 500 is present in an amount of less than 5% by weight of the solvent blend.

References Cited

UNITED STATES PATENTS

| 1,902,257 | 3/1933 | Moss | 260—15 |
|---|---|---|---|
| 1,963,142 | 6/1934 | Moss et al. | 260—15 |
| 3,402,057 | 9/1968 | Coder et al. | 260—17 R |
| 3,055,851 | 9/1962 | Sanderson | 260—17 R |
| 3,036,976 | 5/1962 | Sanderson | 260—17 R |

WILLIAM H. SHORT, Primary Examiner

E. WOODBERRY, Assistant Examiner

U.S. Cl. X.R.

206—1; 260—13, 15, 16, 17